United States Patent
Noda et al.

(10) Patent No.: US 8,210,427 B2
(45) Date of Patent: Jul. 3, 2012

(54) OPERATING DEVICE, AUTHENTICATION DEVICE, AND IMAGE FORMING DEVICE

(75) Inventors: Tatsuo Noda, Nishinomiya (JP); Akihiko Ikazaki, Shizyonawate (JP)

(73) Assignee: Kyocera Document Solutions Inc. (JP)

( * ) Notice: Subject to any disclaimer, the term of this patent is extended or adjusted under 35 U.S.C. 154(b) by 448 days.

(21) Appl. No.: 12/407,061

(22) Filed: Mar. 19, 2009

(65) Prior Publication Data

US 2009/0236410 A1 Sep. 24, 2009

(30) Foreign Application Priority Data

Mar. 24, 2008 (JP) ................. 2008-075114
Mar. 24, 2008 (JP) ................. 2008-075115

(51) Int. Cl.
*G06K 5/00* (2006.01)
(52) U.S. Cl. ........ 235/382; 235/375; 235/380; 235/381; 235/451; 235/492; 340/572.1
(58) Field of Classification Search .................. 235/375, 235/380, 451, 492, 381, 382; 340/572.1
See application file for complete search history.

(56) References Cited

U.S. PATENT DOCUMENTS

| 6,693,511 | B1* | 2/2004 | Seal ............................. 340/10.1 |
| 6,738,572 | B2* | 5/2004 | Hunter .......................... 396/56 |
| 2002/0106202 | A1* | 8/2002 | Hunter .......................... 396/56 |
| 2005/0242921 | A1* | 11/2005 | Zimmerman et al. ......... 340/5.2 |
| 2007/0094715 | A1* | 4/2007 | Brown et al. ..................... 726/5 |
| 2007/0201682 | A1* | 8/2007 | Niimi ........................ 379/355.02 |
| 2007/0288995 | A1* | 12/2007 | Terada et al. ..................... 726/2 |
| 2008/0055408 | A1* | 3/2008 | Wun ............................. 348/122 |
| 2008/0191009 | A1* | 8/2008 | Gressel et al. ................ 235/382 |
| 2008/0220715 | A1* | 9/2008 | Sinha et al. ...................... 455/1 |
| 2008/0289030 | A1* | 11/2008 | Poplett ........................... 726/15 |
| 2011/0092245 | A1* | 4/2011 | Noonan et al. ................ 455/528 |

FOREIGN PATENT DOCUMENTS

| JP | H2-293764 | 12/1990 |
| JP | 2006-86738 | 3/2006 |
| JP | 2006-195888 | 7/2006 |
| JP | 2007-4372 | 1/2007 |

* cited by examiner

*Primary Examiner* — Tuyen K Vo
(74) *Attorney, Agent, or Firm* — Ostrolenk Faber LLP

(57) ABSTRACT

An operating device, including: a non-contact IC reader which reads specific data stored in a non-contact IC; a non-contact IC displacement direction detection device which detects a displace direction of the non-contact IC after the non-contact IC reader has read the specific data; and an operating instruction determination device which determines an operating instruction based on the displacement direction detected by the non-contact IC displacement direction detection device.

4 Claims, 8 Drawing Sheets

FIG. 7

| CARD IDENTIFYING DATA | PERMITTED DISPLACEMENT DATA ||
|---|---|---|
| | FIRST DISPLACEMENT DATA | SECOND DISPLACEMENT DATA |
| 000100 | RIGHT | LEFT |
| 000101 | UP | DOWN |
| 000102 | LEFT | RIGHT |
| . | . | . |
| . | . | . |
| . | . | . |
| 000198 | DOWN | UP |
| 000199 | RIGHT | UP |

OPERATING DEVICE, AUTHENTICATION DEVICE, AND IMAGE FORMING DEVICE

Priority is claimed on Japanese Patent Application No. 2008-075114, filed Mar. 24, 2008, and Japanese Patent Application No. 2008-075115, filed Mar. 24, 2008, the contents of which are incorporated herein by reference.

BACKGROUND OF THE INVENTION

1. Field of the Invention

The present invention relates to an operating device, an authentication device and an image forming device.

2. Description of the Related Art

Control systems which employ IC cards incorporating IC chips with digital data have been developed recently. Japanese Unexamined Patent Publication, First Publication No. 2006-195888, for example, discloses a printing system including an image processing device that reads operating data from a non-contact IC card (contactless IC card) where the operating data is stored and execute an image forming job to form an image based on the operating data. Meanwhile, Japanese Unexamined Patent Publication, First Publication No. H2-293764 discloses a technique for controlling the operation of an image processing device utilizing an IC card from which operating data is sent to the image processing device. In addition, Japanese Unexamined Patent Publication, First Publication No. 2006-86738 discloses a technique for activating a non-contact IC chip incorporated in a mobile device by a user who operates predetermined keys so as to use the IC chip more safely and in particular to prevent accesses to the mobile device by unauthenticated users.

In the above-described related art, the data read from the IC card serves as the operating data for various control processing. If a non-contact IC card is employed, displacement data of the non-contact IC card may be used as the operating data in addition to the data stored therein. There is thus room for improvement in the use of the displacement data of the non-contact IC card as the second operating data in addition to the data stored therein.

Some image forming devices, such as a multi-functional peripheral, include an authentication system that uses non-contact IC cards in order to improve printing management. The image forming devices are often shared by multiple users in, for example, workplaces. Suppose that an office employee enters an instruction for printing on a customer's personal computer. He may place his employee ID card (incorporating a non-contact IC chip) on a separately provided card reader. The card reader reads data from the IC card to authenticate the printing. With this authentication system, it is less likely that a printed matter will be left in the image forming device and thus the users can manage their printing in a reliable way. Japanese Unexamined Patent Publication, First Publication No. 2007-4372 discloses an example of such the authentication system that employs non-contact IC cards. In the disclosed system, a control device permits usage of an image forming device only when an authentication ID read from a non-contact IC card is in agreement with a previously registered authentication ID.

In the above-described related art, the user is authenticated based on the data read by the card reader from the non-contact IC card. In case of loss of the non-contact IC card, however, a third party who inadvertently obtained the IC card and attempts to cause the card reader to read the data from the IC card may also be authenticated.

SUMMARY OF THE INVENTION

The present invention is made in view of the aforementioned circumstances and an object thereof is to provide an operating device and an image forming device in which displacement data of a non-contact IC is used as operating data.

Another object of the present invention is to provide an authentication device and an image forming device that prevents authentication of a third party with an improperly used non-contact IC.

In order to achieve the above-described objects, the present invention employs the following. Namely, the present invention employs an operating device, including: a non-contact IC reader which reads specific data stored in a non-contact IC; a non-contact IC displacement direction detection device which detects a displace direction of the non-contact IC after the non-contact IC reader has read the specific data; and an operating instruction determination device which determines an operating instruction based on the displacement direction detected by the non-contact IC displacement direction detection device.

The above-described operating device and the image forming device incorporating the same include: the non-contact IC displacement direction detection device which detects a displace direction of the non-contact IC after the non-contact IC reader has read the specific data; and the operating instruction determination device which determines an operating instruction based on the displacement direction detected by the non-contact IC displacement direction detection device. With this configuration, the displacement data of the non-contact IC may be used as the operating data.

The present invention also employs the following means to achieve the foregoing objects. Namely, the present invention employs an authentication device, including: a non-contact IC reader which reads identification data stored in a non-contact IC; a non-contact IC displacement direction detection device which detects a displacement direction of the non-contact IC after the non-contact IC reader has read the identification data; and an authentication determination device which determines whether or not authentication is to be made based on the identification data and the displacement direction detected by the non-contact IC displacement direction detection device.

The above-described operating device and the image forming device incorporating the same include: the non-contact IC reader for reading the identification data stored in the non-contact IC; the non-contact IC displacement direction detection device which detects a displacement direction of the non-contact IC after the non-contact IC reader has read the identification data; and the an authentication determination device which determines whether or not authentication is to be made based on the identification data and the displacement direction detected by the non-contact IC displacement direction detection device. With this configuration, whether or not authentication is to be made is determined based not only on the identification data stored in the non-contact IC but also on the displacement data of the non-contact IC. Accordingly, even in case of loss of the non-contact IC card, a third party who attempts to use the IC card cannot easily be authenticated. In this manner, authentication of the third party can be prevented.

BRIEF DESCRIPTION OF THE DRAWINGS

FIG. 7 shows a schematic registration table for login permission of the multi-functional peripheral 100A according to the second embodiment.

DETAILED DESCRIPTION OF THE INVENTION

First Embodiment

Figure 1:
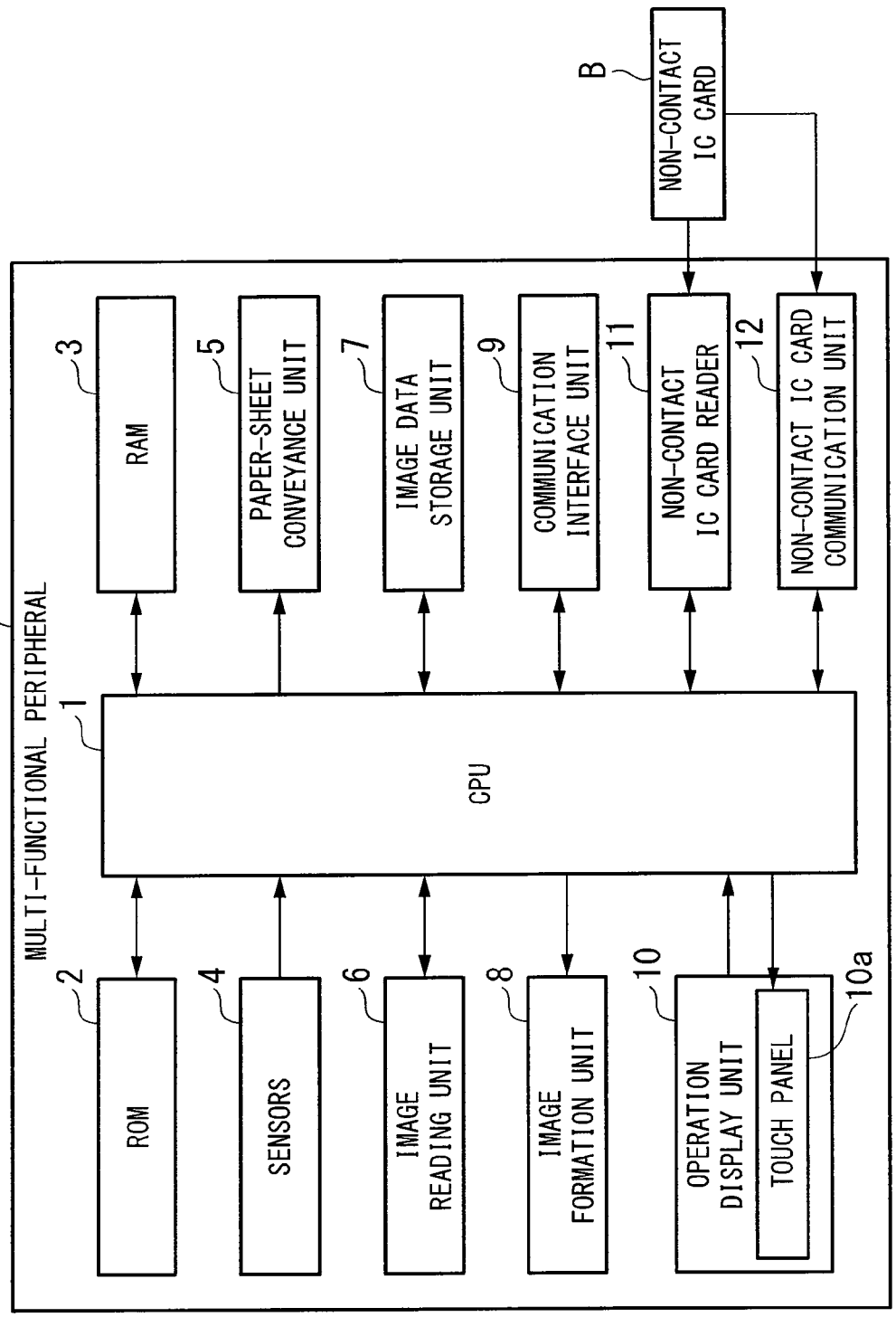
FIG. 1 shows a schematic configuration of an image forming system that includes a multi-functional peripheral A according to a first embodiment of the present invention.

Referring now to the drawings, a first embodiment of the present invention will be described. The present embodiment relates to a multi-functional peripheral, which is a type of image forming device and functions as a copier and a printer. FIG. 1 shows a schematic configuration of an image forming system that includes a multi-functional peripheral A according to the present embodiment. The image forming system includes the multi-functional peripheral A and a non-contact IC card (contactless IC card) B.

The multi-functional peripheral A includes a central processing unit (CPU) 1, a read only memory (ROM) 2, a random access memory (RAM) 3, sensors 4, a paper-sheet conveyance unit 5, an image reading unit 6, an image data storage unit 7, an image formation unit 8, a communication interface unit 9, an operation display unit 10, a non-contact IC card reader 11 and a non-contact IC card communication unit 12.

The CPU 1 controls the entire operation of the multi-functional peripheral A based on a control program stored in the ROM 2, image data stored in the image data storage unit 7, printing instructions input from an external device via the communication interface unit 9, operating instruction received by the operation display unit 10 and signals received by the non-contact IC card reader 11 and the non-contact IC card communication unit 12 from the non-contact IC card B. The control processing in the CPU 1 will be described in detail as an operation of the multi-functional peripheral A.

The ROM 2 is a non-volatile memory that stores control programs to be executed by the CPU 1 as well as other data.

The RAM 3 is a volatile memory used as a working area in which data is temporarily stored during execution of the control programs for various operations by the CPU 1.

The sensors 4 may be a paper-out detection sensor, a paper jam detection sensor, a paper position detection sensor and a temperature sensor, which are required for image formation. The data acquired by these sensors will be output to the CPU 1 as detection signals.

The paper-sheet conveyance unit 5 includes: rollers that convey paper sheets from a sheet tray to the image formation unit 8; and a motor for driving the rollers. The paper-sheet conveyance unit 5 also includes: rollers that convey paper sheets with images formed thereon to an discharge tray (not shown in the figures); and a motor for driving the rollers.

The image reading unit 6 includes an automatic document feeder (ADF) and a charge-coupled device (CCD) sensor. The image reading unit 6 controls the CCD sensor to read images of originals sequentially fed by the ADF and outputs image data corresponding to the original images to the CPU 1. The CPU 1 controls the image data storage unit 7 to store the original image data input from the image reading unit 6.

The image data storage unit 7 (e.g., a flash memory) stores the original image data upon request by the CPU 1 or outputs the stored original image data to the CPU 1.

The image formation unit 8 transfers toner to the paper sheet conveyed by the paper-sheet conveyance unit 5 under control of the CPU 1 based on the image data stored in the image data storage unit 7 and then fixes the toner.

The communication interface unit 9 is connected to external devices, such as a personal computer (not shown in the figures), on local area network and transmits various signals to or receives various signals from the external devices.

The operation display unit 10 includes various operation keys such as a start key for inputting print instruction, a stop key for stopping ongoing image processing and a numeric keypad (i.e., keys for inputting numerical characters) for inputting numbers such as a printout number. The operation display unit 10 includes a touch panel 10a displaying an image for operation, which is also used as a controller. The operation display unit 10 outputs operating instruction to the CPU 1 in accordance with the keys operated and displays various images on the touch panel 10a under control of the CPU 1.

A built-in coil of the non-contact IC card reader 11 generates magnetic flux under control of the CPU 1 such that the non-contact IC incorporated in the non-contact IC card B generates induced electric power. The non-contact IC card reader 11 receives the operating data transmitted from the non-contact IC by means of the induced electric power and outputs the operating data to the CPU 1.

Figure 2:
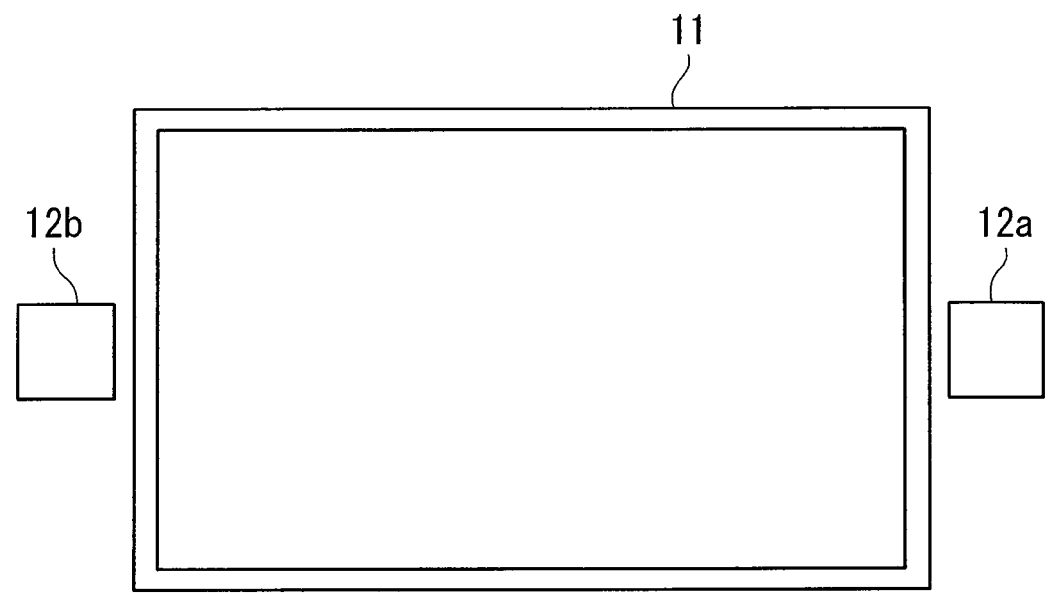
FIG. 2 shows an arrangement of antennas 12a and 12b of a non-contact IC card communication unit 12 of the multi-functional peripheral A according to the first embodiment.

The non-contact IC card communication unit 12 includes two antennas 12a and 12b disposed at right and left sides of the non-contact IC card reader 11 in the vicinity of an outer edge of the non-contact IC card reader 11 as shown in FIG. 2. The non-contact IC card communication unit 12 communicates wirelessly with the non-contact IC in a manner similar to the non-contact IC card reader 11. A built-in coil of the non-contact IC card communication unit 12 generates magnetic flux power under control of the CPU 1 such that the non-contact IC incorporated in the non-contact IC card B generates induced electric. The non-contact IC card communication unit 12 receives signals transmitted from the non-contact IC by means of the induced electric power. The non-contact IC card communication unit 12 then outputs a reception-state detection signal indicating the reception intensity at the antennas 12a and 12b to the CPU 1.

Figure 3:
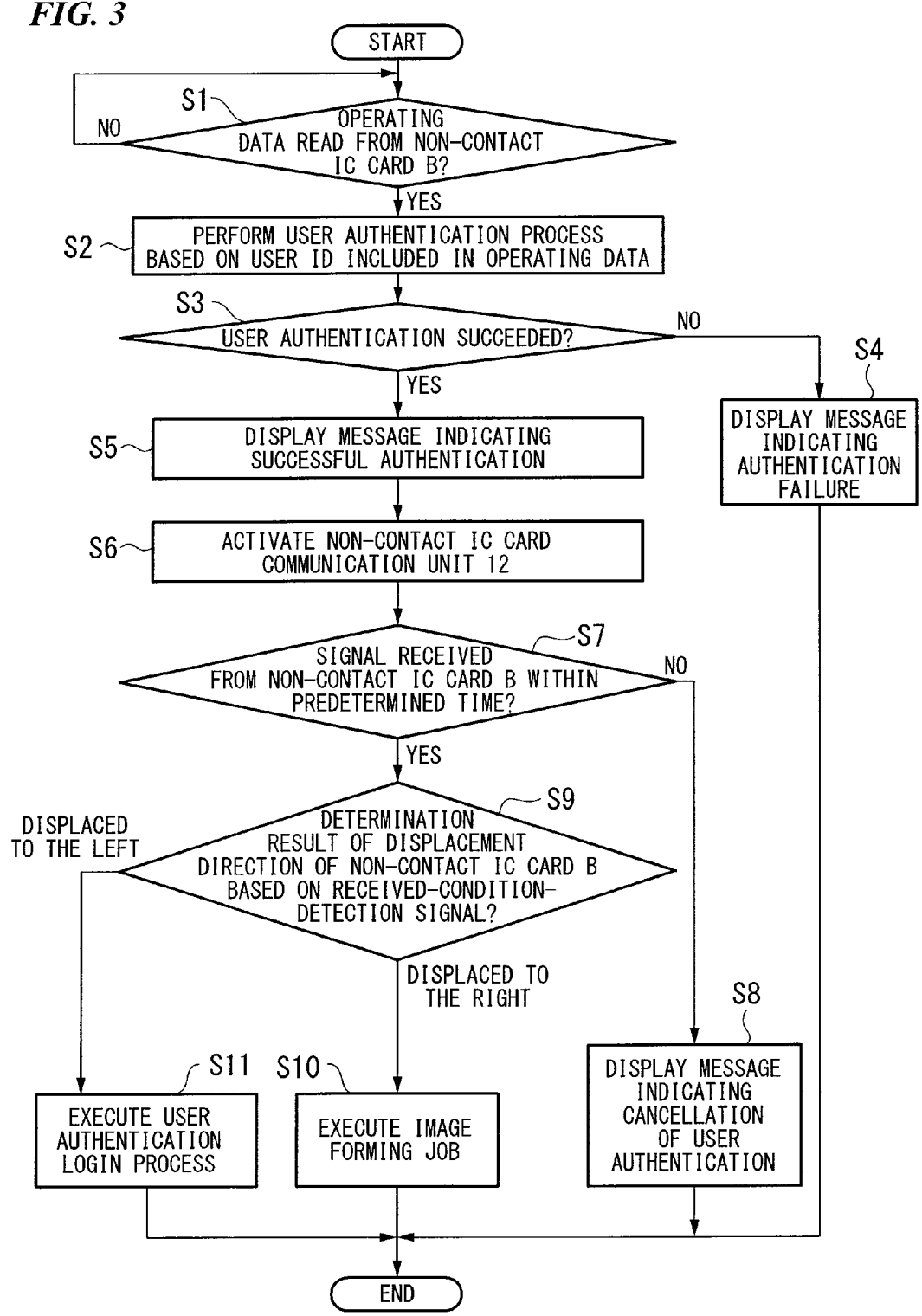
FIG. 3 is a flowchart illustrating an operation of the multi-functional peripheral A according to the first embodiment.

Next, operation of the thus-configured multi-functional peripheral A according to the present embodiment will be described in detail with reference to FIG. 3. FIG. 3 is a flowchart illustrating an operation of the multi-functional peripheral A according to the present embodiment.

A user places the non-contact IC card B storing the operating data on the non-contact IC card reader 11 so as to activate the multi-functional peripheral A. The CPU 1 determines whether or not the non-contact IC card reader 11 has read the operating data from the non-contact IC card B (step S1). If the determination result is "NO" in step S1 (i.e., if the CPU 1 determines that the non-contact IC card reader 11 has not read the operating data from the non-contact IC card B), the CPU 1 stands by until the non-contact IC card reader 11 has read the operating data from the non-contact IC card B. If the determination result is "YES" in step S1 (i.e., if the CPU 1 determines that the non-contact IC card reader 11 has read the operating data from the non-contact IC card B), then the CPU 1 begins a user authentication process based on a user ID included in the operating data (step S2).

The CPU 1 determines whether or not the user has been authenticated based on the user ID included in the operating data (step S3). If the determination result is "NO" in step S3 (i.e., if the CPU 1 determines that the user is not authenticated), the CPU 1 controls the touch panel 10a to display thereon a message indicating authentication failure (step S4). If the determination result is "YES" in step S3 (i.e., if the CPU 1 determines the user is successfully authenticated), the CPU 1 controls the touch panel 10a to display thereon a message indicating successful authentication (step S5), and activates the non-contact IC card communication unit 12 (step S6).

The CPU 1 determines whether or not the non-contact IC card communication unit 12 has received a signal from the non-contact IC card B within a predetermined time after step S6 is completed (step S7). If the determination result is "NO" in step S7 (i.e., if the CPU 1 determines that the non-contact IC card communication unit 12 has not received any signals from the non-contact IC card B within the predetermined time), the CPU 1 controls the touch panel 10a to display thereon a message indicating cancellation of the user authentication (step S8).

If the determination result is "YES" in step S7 (i.e., if the CPU 1 determines that the non-contact IC card communication unit 12 has received a signal from the non-contact IC card B within the predetermined time), then the CPU 1 determines a displacement direction of the non-contact IC card B based on a reception-state detection signal input from the non-contact IC card communication unit 12, which received the signal from the non-contact IC card B (step S9). If the reception intensity at the antenna 12a indicated by the reception-state detection signal in step S9 is greater than a predetermined threshold, the CPU 1 determines that the non-contact IC card B is displaced to the right. If the reception intensity at the antenna 12b is greater than the predetermined threshold, the CPU 1 determines that the non-contact IC card B is displaced to the left.

If the non-contact IC card B is determined to be displaced to the right in step S9, the CPU 1 executes an image forming job based on image formation job data included in the operating data (step S10). Similarly, if the non-contact IC card B is determined to be displaced to the left, the CPU 1 executes an authentication login process for the user (step S11).

Figure 4:
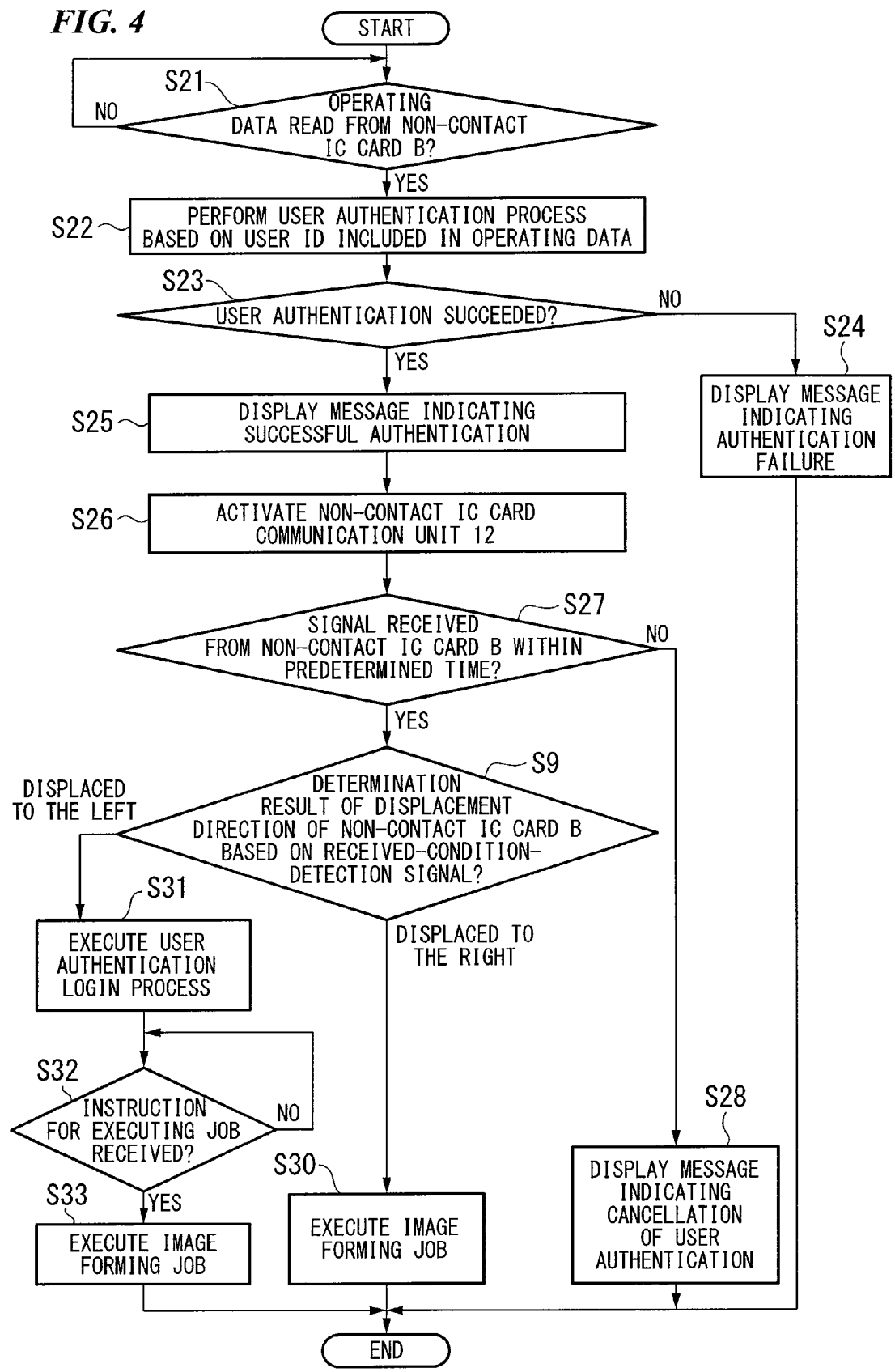
FIG. 4 is a flowchart illustrating a modified operation of the multi-functional peripheral A according to the first embodiment.

Next, a modified example of the above operation in the multi-functional peripheral A shown in FIG. 3 will be described with reference to FIG. 4. FIG. 4 is a flowchart illustrating an modified example of an operation in the multi-functional peripheral A. Since steps S21 to S29 in FIG. 4 are similar to steps S1 to S9, description thereof will be omitted.

If the non-contact IC card B is determined to be displaced to the right based on a reception-state detection signal in step S29, the CPU 1 executes an image forming job based on image formation job data included in the operating data (step S30). If the non-contact IC card B is determined to be displaced to the left, the CPU 1 sets up various conditions for image formation during execution of the image forming job, including selecting a double-side printing mode or a single-side printing mode, based on the image forming job data (step S31).

The CPU 1 then determines whether or not an operation display unit 10 has received an instruction for executing a job from a user who pressed a start key after step S31 (step S32). If the determination result is "NO" in step S32 (i.e., if the CPU 1 determines that the operation display unit 10 has not received the instruction for executing the job), the CPU 1 stands by until the operation display unit 10 has received the instruction for executing the job. If the determination result is "YES" in step S32 (i.e., if the CPU 1 determines that the operation display unit 10 has received the instruction for executing the job), then the CPU 1 executes an image forming job based on the conditions set up in step S31 (step S33).

As described above, in the multi-functional peripheral A according to the present embodiment, the antennas 12a and 12b of the non-contact IC card communication unit 12 are disposed at right and left sides of the non-contact IC card reader 11 in the vicinity of an outer edge of the non-contact IC card reader 11. The non-contact IC card reader 11 reads the operating data from the non-contact IC card B. Upon authentication of the user based on the user data included in the operating data, the CPU 1 allows communication between the non-contact IC card communication unit 12 and the non-contact IC card B. The CPU 1 then determines a displacement direction of the non-contact IC based on the reception-state detection signal indicating the reception intensity at the antennas 12a and 12b. In response to the determination result, the CPU 1 executes various processing using the data on the displacement direction of the non-contact IC card B as the operating data.

In the multi-functional peripheral A, the operating data stored in the non-contact IC card B can be used as well as the displacement data of the non-contact IC card B. In the multi-functional peripheral A, thus the CPU 1 executes various processing based on combinations of the operating data and the displacement data of the non-contact IC card B.

Although the first embodiment of the present invention has been described, the present invention is not limited thereto. For example, the following modification may be made to the embodiment.

(1) In the above-described embodiment, the non-contact IC card communication unit 12 communicates wirelessly with the non-contact IC in a manner similar to the non-contact IC card reader 11, and the CPU 1 determines the displacement direction based on the reception-state detection signal input from the non-contact IC card communication unit 12 which received the signals transmitted from the non-contact IC card B. The present invention, however, is not limited to this.

For example, instead of the non-contact IC card communication unit 12, infrared sensors may be provided at right and left sides of the non-contact IC card reader 11 in the vicinity of an outer edge of non-contact IC card reader 11. With this configuration, the CPU 1 may determine the displacement direction of the non-contact IC card B based on the detection by the infrared sensors.

(2) In the above-described embodiment, the antennas of the non-contact IC card communication unit 12 are disposed at right and left sides of the non-contact IC card reader 11 in the vicinity of an outer edge of the non-contact IC card reader 11. The present invention, however, is not limited to this.

For example, the antennas of the non-contact IC card communication unit 12 may be disposed at upper, lower, right and left sides of the non-contact IC card reader 11 in the vicinity of an outer edge of the non-contact IC card reader 11. The antennas may alternatively be provided at the corners of the non-contact IC card reader 11. In these cases, the CPU 1 may execute predetermined processing based on the displacement of the non-contact IC card B to the upper, lower, right or left side or to the corners of the non-contact IC card reader 11. The antennas may therefore be provided at any positions without limitation.

(3) In the above-described embodiment, the CPU 1 executes various processing based on the displacement of the non-contact IC card B to the right or left. The present invention, however, is not limited to this.

The CPU 1 may execute various processing based on combinations of the displacement directions of a non-contact IC card in accordance with the variation in the reception intensity at the antennas 12a and 12b indicated by the reception-state detection signals. For example, the CPU 1 may determine that the non-contact IC card has been first displaced to the right and then to the left, or first displaced to the left and then to the right and then execute various processing based on the combinations of the order of the displacement.

Second Embodiment

Figure 5:
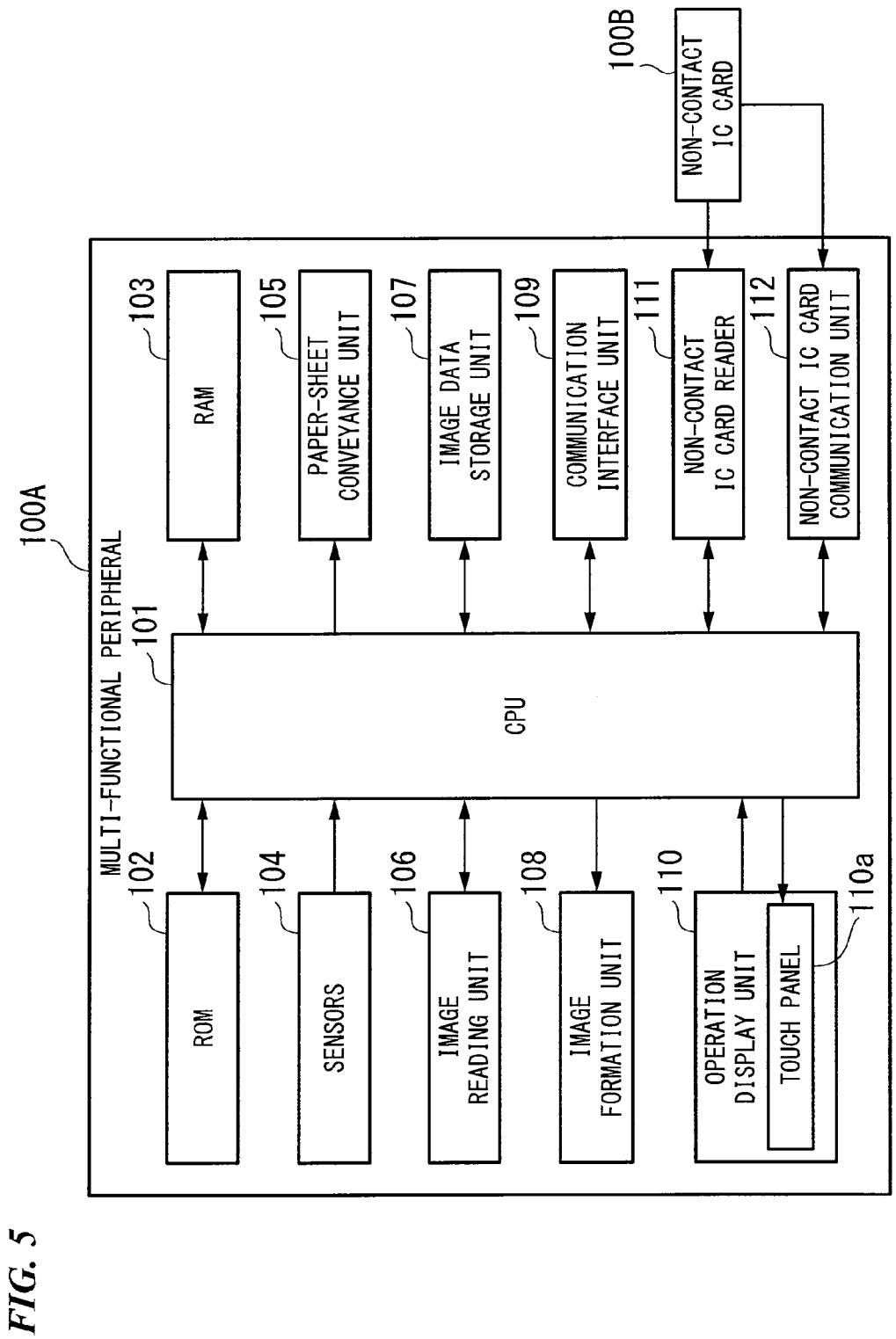
FIG. 5 shows a schematic configuration of a login authentication system that includes a multi-functional peripheral 100A according to a second embodiment of the present invention.

Referring now to the drawings, a second embodiment of the present invention will be described. The present embodiment relates to a multi-functional peripheral, which is a type of image forming device and which functions as a copier and a printer. FIG. 5 shows a schematic configuration of a login authentication system that includes a multi-functional peripheral 100A according to the present embodiment. The authentication system includes the multi-functional peripheral 100A and a non-contact IC card (contactless IC card) 100B.

The multi-functional peripheral 100A includes a central processing unit (CPU) 101, a read only memory (ROM) 102, a random access memory (RAM) 103, sensors 104, a paper-sheet conveyance unit 105, an image reading unit 106, an image data storage unit 107, an image formation unit 108, a communication interface unit 109, an operation display unit 110, a non-contact IC card reader 111 and a non-contact IC card communication unit 112.

The CPU 101 controls the entire operation of the multi-functional peripheral 100A based on a control program stored in the ROM 102, image data stored in the image data storage unit 107, printing instruction input from an external device via the communication interface unit 109, operating instruction received by the operation display unit 110 and signals received by the non-contact IC card reader 111 and the non-contact IC card communication unit 112 from the non-contact IC card 100B. The control processing in the CPU 101 will be described in detail as an operation of the multi-functional peripheral 100A.

The ROM 102 is a non-volatile memory that stores control programs to be executed by the CPU 101 as well as other data. The ROM 2 stores a registration table for login permission in which data on the non-contact IC cards permitted for login to the multi-functional peripheral 100A is registered. FIG. 7 shows a schematic registration table for login permission, which includes identification data for the non-contact IC cards that are given permission to login to the multi-functional peripheral 100A. The identification data is inherent to the non-contact IC card 100B and other non-contact IC cards (not shown in the figures) and stored in each of the non-contact IC cards.

The registration table includes permitted displacement data indicating displacement of the non-contact IC card, to which the CPU 101 has given login permission after the card identification data is obtained by the non-contact IC card reader 111 from the non-contact IC card 100B. The registration table has registered therein displacement directions of the non-contact IC card 100B with respect to the non-contact IC card reader 111. The permitted displacement data includes first and second displacement data respectively regarding first and second displacement directions of the non-contact IC card 100B. The CPU 101 determines whether or not the user is permitted to login to the multi-functional peripheral 100A while retrieving the registration table.

The RAM 103 is a volatile memory used as a working area in which data is temporarily stored during execution of the control programs for various operations by the CPU 101.

The sensors 104 may be a paper-out detection sensor, a paper jam detection sensor, a paper position detection sensor and a temperature sensor, which are required for image formation. The data detected by these sensors will be output to the CPU 101 as detection signals.

The paper-sheet conveyance unit 105 includes: rollers that convey paper sheets from a sheet tray to the image formation unit 108; and a motor for driving the rollers. The paper-sheet conveyance unit 105 also includes: rollers that convey paper sheets with images formed thereon to an discharge tray (not shown in the figures) and a motor for driving the rollers.

The image reading unit 106 includes an automatic document feeder (ADF) and a charge-coupled device (CCD) sensor. The image reading unit 106 controls the CCD sensor to read images of originals sequentially fed by the ADF and outputs the image data corresponding to the original images to the CPU 101. The CPU 101 controls the image data storage unit 107 to store the original image data input from the image reading unit 106.

The image data storage unit 107 (e.g., a flash memory) stores the original image data upon request by the CPU 101 or outputs the stored original image data to the CPU 101.

The image formation unit 108 transfers toner to the paper sheet conveyed by the paper-sheet conveyance unit 105 under control of the CPU 101 based on the image data stored in the image data storage unit 107 and then fixes the toner.

The communication interface unit 109 is connected to external devices, such as a personal computer (not shown in the figures), on local area network and transmits various signals to or receives various signals from the external devices.

The operation display unit 110 includes various operation keys such as a start key, a stop key, a power key, a numeric keypad (i.e., keys for inputting numerical characters), touch panel 110a and a clear key. The operation display unit 110 outputs operating instructions to the CPU 101 in accordance with the keys operated and displays various images on the touch panel 110a under control of the CPU 101.

A built-in coil of the non-contact IC card reader 111 generates magnetic flux under control of the CPU 101 such that the non-contact IC incorporated in the non-contact IC card 100B generates induced electric power. The non-contact IC card reader 111 receives card identification data transmitted from the non-contact IC by means of the induced electric power and outputs the card identification data to the CPU 101.

Figure 6:
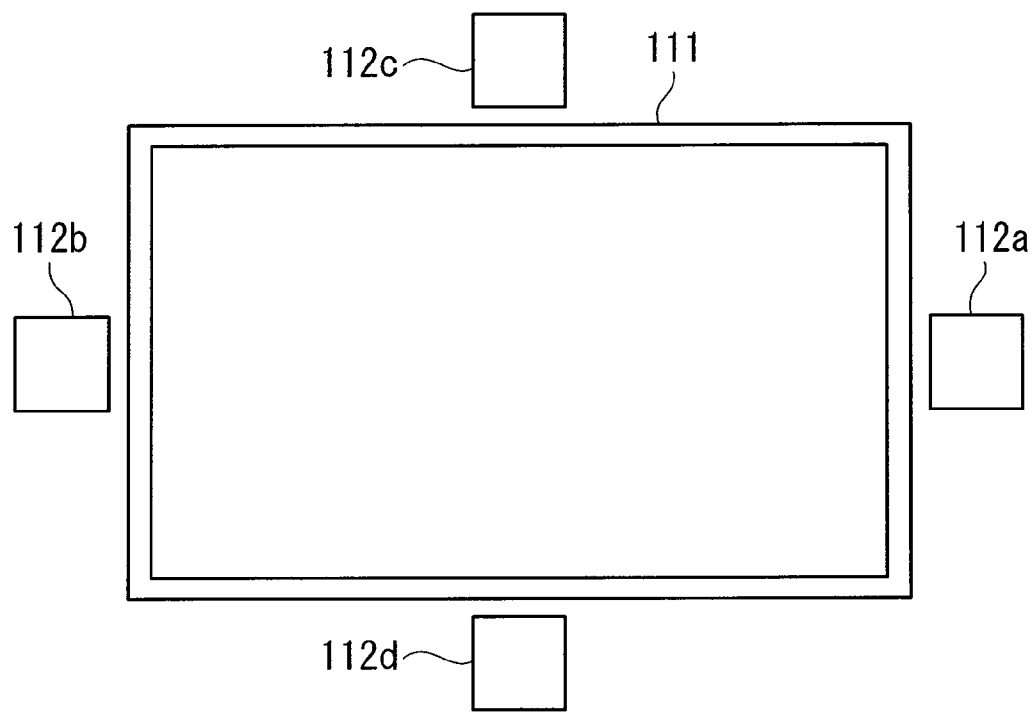
FIG. 6 shows an arrangement of antennas 112a, 112b, 112c and 112d of a non-contact IC card communication unit 112 of the multi-functional peripheral 100A according to the second embodiment.

The non-contact IC card communication unit 112 includes four antennas 112a, 112b, 112c and 112d disposed at upper, lower, right and left sides of the non-contact IC card reader 111 in the vicinity of an outer edge of the non-contact IC card reader 111 as shown in FIG. 6.

The non-contact IC card communication unit 112 communicates wirelessly with the non-contact IC in a manner similar to the non-contact IC card reader 111. A built-in coil of the non-contact IC card communication unit 112 generates magnetic flux under control of the CPU 101 such that the non-contact IC incorporated in the non-contact IC card 100B generates induced electric power. The non-contact IC card communication unit 112 receives signals transmitted from the non-contact IC by means of the induced electric power. The non-contact IC card communication unit 112 then outputs to the CPU 101 a reception-state detection signal indicating reception intensity at the antennas 112*a*, 112*b*, 112*c* and 112*d* of the signals received from the non-contact IC.

Figure 8:
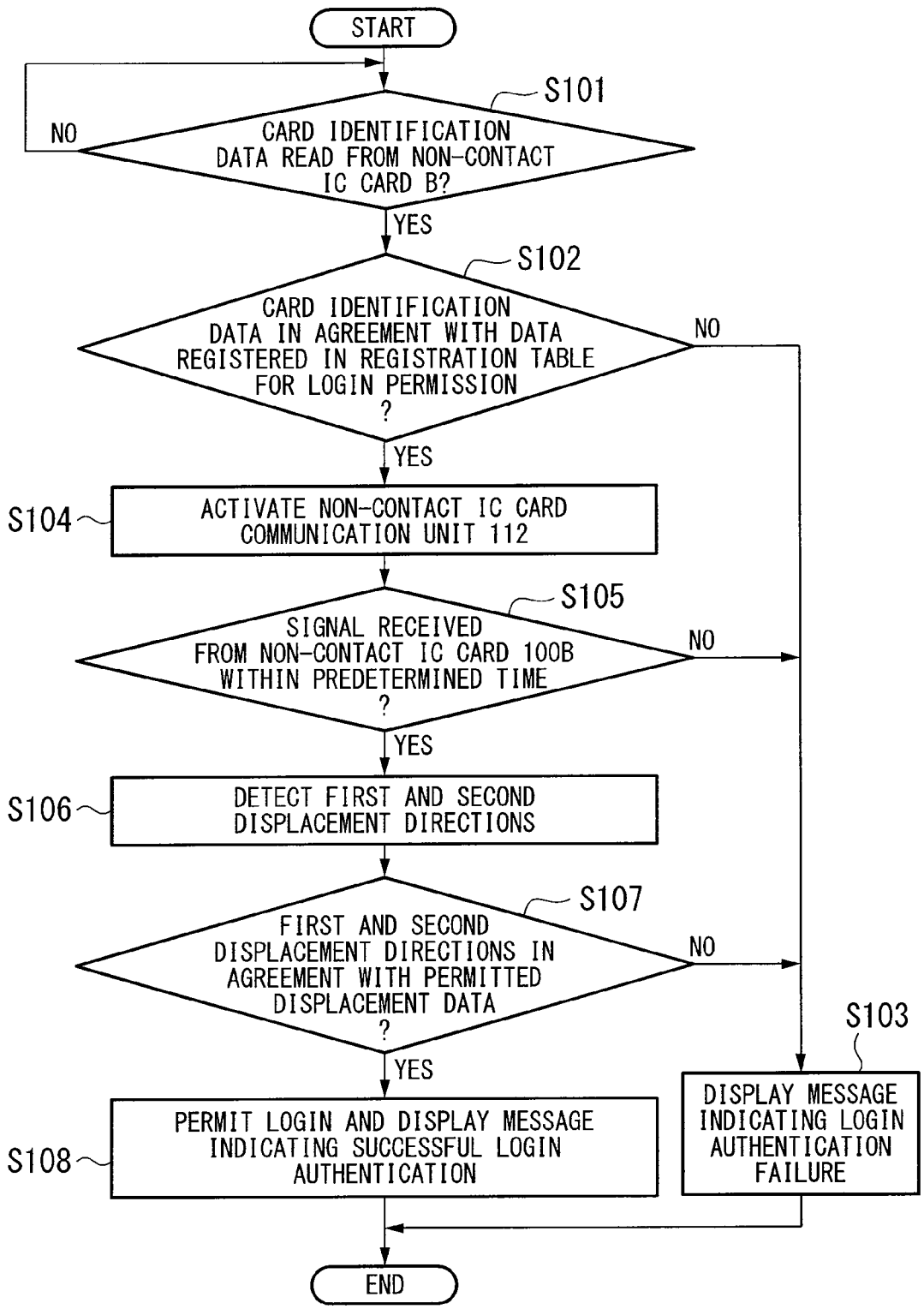
FIG. 8 is a flowchart illustrating an operation of the multi-functional peripheral 100A according to the second embodiment.

Next, operation of the thus-configured multi-functional peripheral 100A according to the present embodiment will be described in detail with reference to FIG. 8. FIG. 8 is a flowchart illustrating an operation of the multi-functional peripheral 100A according to the present embodiment.

A user places the non-contact IC card 100B storing the operating data on the non-contact IC card reader 111 so as to login to the multi-functional peripheral 100A and the multi-functional peripheral 100A begins the following operations.

The CPU 101 determines whether or not the non-contact IC card reader 111 has read the card identification data from the non-contact IC card 100B (step S101). If the determination result is "NO" in step S101 (i.e., if the non-contact IC card reader 111 has not read the card identification data from the non-contact IC card 100B), the CPU 101 stands by until the non-contact IC card reader 111 has read the card identification data from the non-contact IC card 100B. If the determination result is "YES" in step S101 (i.e., if the non-contact IC card reader 111 has read the card identification data from the non-contact IC card 100B), then the CPU 101 determine whether or not the card identification data is in agreement with the data registered in the registration table stored in the ROM 102 (step S102).

If the determination result is "NO" in step S102 (i.e., if the card identification data on the non-contact IC card 100B is not registered in the registration table), the CPU 101 controls the touch panel 110*a* to display thereon a message indicating login authentication failure (step S103). If the determination result is "YES" in step S102 (i.e., if the card identification data on the non-contact IC card 100B is registered in the registration table), then the CPU 101 activates the non-contact IC card communication unit 112 (step S104).

The CPU 101 determines whether or not the non-contact IC card communication unit 112 has received a signal from the non-contact IC card 100B within a predetermined time after step S104 is completed (step S105). If the determination result is "NO" in step S105 (i.e., if the CPU 101 determines that the non-contact IC card communication unit 112 has not received any signals from the non-contact IC card 100B within the predetermined time), the routine proceeds to step S103 where the CPU 101 controls the touch panel 110*a* to display thereon a message indicating authentication failure.

If the determination result is "YES" in step S105 (i.e., if the CPU 101 determines that the non-contact IC card communication unit 112 has received a signal from the non-contact IC card 100B within the predetermined time), the CPU 101 detects the first displacement direction and then the second displacement direction of the non-contact IC card 100B based on a reception-state detection signal input from the non-contact IC card communication unit 112 that received the signal from the non-contact IC card 100B (step S106).

If it is determined that the signal reception intensity at the antenna 112*a* indicated by the reception-state detection signal in step S106 is greater than a predetermined threshold, then the CPU 101 determines that the non-contact IC card 100B is displaced to the right. If the signal reception intensity at the antenna 112*b* is greater than a predetermined threshold, the CPU 101 determines that the non-contact IC card 100B is displaced to the left. If the signal reception intensity at the antenna 112*c* is greater than a predetermined threshold, the CPU 101 determines that the non-contact IC card 100B is displaced upward. If the signal reception intensity at the antenna 112*d* is greater than a predetermined threshold, the CPU 101 determines that the non-contact IC card 100B is displaced downward.

The CPU 101 then determines whether or not the first and second displacement directions detected in step S106 are in agreement with the permitted displacement data corresponding to the card identification data of the non-contact IC card 100B registered in the registration table (step S107). If the determination result is "YES" in step S107 (i.e., if the first and second displacement directions of the non-contact IC card 100B are in agreement with the data registered in the registration table), then the CPU 101 permits login with the non-contact IC card 100B and controls the touch panel 110*a* to display thereon a message indicating successful authentication (step S108). If the determination result is "NO" in S107 (i.e., if the first and second displacement directions of the non-contact IC card 100B are not in agreement with the data registered in the registration table), the routine proceeds to step S103 where the CPU 101 controls the touch panel 110*a* to display thereon a message indicating login authentication failure.

As described above, in the multi-functional peripheral 100A according to the present embodiment, the antennas 112*a*, 112*b*, 112*c* and 112*d* of the non-contact IC card communication unit 112 are disposed at upper, lower, right and left sides of the non-contact IC card reader 111 in the vicinity of an outer edge of the non-contact IC card reader 111. Upon agreement between the card identification data stored in the non-contact IC card 100B read by the non-contact IC card reader 111 and the data registered for login permission, the CPU 101 allows communication between the non-contact IC card communication unit 112 and the non-contact IC card 100B. The CPU 101 detects the first and second displacement directions based on the reception-state detection signal indicating the received signal intensity at the antennas 112*a*, 112*b*, 112*c* and 112*d* of the signals received from the non-contact IC card 100B. Upon agreement between the first and second displacement directions and the data registered for login permission, the CPU 101 gives login permission. With this configuration, even in the case of loss of the non-contact IC card 100B, a third party who attempts to cause the non-contact IC card reader 111 to read the non-contact IC card 100B cannot login to the multi-functional peripheral 100A unless he displaces the non-contact IC card 100B in the directions registered in the permitted displacement data. It is therefore difficult for a third party to login with the non-contact IC card 100B. In this manner, authentication of the third party can be prevented.

Although the second embodiment of the present invention has been described, the present invention is not limited thereto. For example, the following modification may be made to the embodiment.

(1) In the above-described embodiment, the antennas 112*a*, 112*b*, 112*c* and 112*d* are disposed at upper, lower, right and left sides of the non-contact IC card reader 111 in the vicinity of an outer edge of the non-contact IC card reader 111. The present invention, however, is not limited to this.

For example, the antennas of the non-contact IC card communication unit 112 may alternatively be disposed at right and left sides or at upper and lower sides in the vicinity of the outer edge of the non-contact IC card reader 111 or at the corners of the non-contact IC card reader 111. With this configuration, the CPU 101 may execute predetermined processes in accordance with the displacement direction of the non-contact IC card 100B to the right, left, upper or lower side or to the corners. The antennas may therefore be provided at any positions without limitation.

(2) In the above-described embodiment, the non-contact IC card communication unit 112 communicates wirelessly with the non-contact IC in a manner similar to the non-contact IC card reader 111 and the CPU 101 then detects the first and second displacement directions based on the reception-state detection signal input from the non-contact IC card communication unit 112, which received the signals transmitted from the non-contact IC card B. The present invention, however, is not limited to this.

For example, instead of the non-contact IC card communication unit 112, infrared sensors may be provided at right and left sides of the non-contact IC card reader 111 in the vicinity of an outer edge of non-contact IC card reader 111. With this configuration, the CPU 101 may detect the first and second displacement directions of the non-contact IC card 100B based on the detection by the infrared sensors.

With reference to the above-described embodiments, the present invention may be summarized as follows. Namely, the present invention employs an operating device, including: a non-contact IC reader which reads specific data stored in a non-contact IC; a non-contact IC displacement direction detection device which detects a displace direction of the non-contact IC after the non-contact IC reader has read the specific data; and an operating instruction determination device which determines an operating instruction based on the displacement direction detected by the non-contact IC displacement direction detection device.

It may be arranged such that the non-contact IC displacement direction detection device includes a plurality of antennas disposed apart from one another and detects the displacement direction of the non-contact IC based on a variation pattern of the intensity of signal received at the antennas from the non-contact IC.

It may be arranged such that the antennas are disposed so as to surround the non-contact IC reader.

In addition, the present invention employs an image forming device that includes the above-described operating device and forms an image based on the operating instructions determined by the operating device.

The present invention also employs an authentication device, including: a non-contact IC reader which reads identification data stored in a non-contact IC; a non-contact IC displacement direction detection device which detects a displacement direction of the non-contact IC after the non-contact IC reader has read the identification data; and an authentication determination device which determines whether or not authentication is to be made based on the identification data and the displacement direction detected by the non-contact IC displacement direction detection device.

It may be arranged such that the non-contact IC displacement direction detection device includes a plurality of antennas disposed apart from one another and detects the displacement direction of the non-contact IC based on a variation pattern of the intensity of signal received at the antennas from the non-contact IC.

It may be arranged such that the antennas are disposed so as to surround the non-contact IC reader.

In addition, the present invention employs an image forming device that includes the above-described authentication device and forms an image based on the determination results of the authentication device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An authentication device, comprising:
    a non-contact IC reader which reads identification data stored in a non-contact IC;
    a non-contact IC displacement direction detection device which detects first and second displacement direction of the non-contact IC after the non-contact IC reader has read the identification data; and
    an authentication determination device which stores permitted identification data and permitted displacement data on displacement directions of the non-contact IC given for each permitted identification data, and determines whether or not authentication is to be made based on the permitted identification data, the identification data stored in the non-contact IC, the permitted displacement data, and the first and second displacement directions detected by the non-contact IC displacement direction detection device,
    the permitted displacement data including permitted first displacement data, permitted second displacement data, and permitted ordinal data, the permitted ordinal data representing the first displacement direction which is firstly detected and the second displacement direction which is detected subsequent to the first displacement direction.

2. The authentication device according to claim 1, wherein the non-contact IC displacement direction detection device includes a plurality of antennas disposed apart from one another and detects the displacement direction of the non-contact IC based on a variation pattern of the intensity of signal received at the antennas from the non-contact IC.

3. The authentication device according to claim 2, wherein the antennas are disposed so as to surround the non-contact IC reader.

4. An image forming device, comprising an authentication device according to claim 1, wherein an image is formed based on a determination result of the authentication device.

* * * * *